United States Patent [19]

Sofue et al.

[11] Patent Number: 5,075,531
[45] Date of Patent: Dec. 24, 1991

[54] ELECTRIC RESISTANT WELDING FOR ZINC PLATED STEEL PLATE

[75] Inventors: Tadashi Sofue, Obu; Toichi Watanabe, Kagamihara, both of Japan

[73] Assignees: Kabushiki Kaisha Toyoda Jidoshokki Seisakusho, Kariya; Toichi Watanabe, Kagamihara, both of Japan

[21] Appl. No.: 429,644

[22] Filed: Oct. 31, 1989

Related U.S. Application Data

[63] Continuation-in-part of Ser. No. 117,913, Nov. 3, 1987, Pat. No. 4,922,075.

[30] Foreign Application Priority Data

Nov. 7, 1986 [JP] Japan .................... 61-265810

[51] Int. Cl.$^5$ .............................................. B23K 9/00
[52] U.S. Cl. ..................................... 219/118; 219/93; 219/94
[58] Field of Search .............. 219/118, 117.1, 92, 219/93, 94

[56] References Cited

U.S. PATENT DOCUMENTS 2,452,805  11/1948  Sussenbach ........................ 219/92
2,506,728  5/1950  McGrath .
3,102,190  8/1963  Chapleur et al. .
3,135,854  6/1964  Deininger ........................... 219/92
3,602,682  8/1971  Hoeffleur ............................ 219/92
4,079,163  3/1978  Tanaka et al. .
4,195,215  3/1980  Clarke .............................. 219/92 X

OTHER PUBLICATIONS

Patent Abstracts of Japan, vol. 4, No. 173 (C-32) [655] Nov. 29, 1980, JP-A-55 110783 (Sumitomo Kinzoka Kogyo K.K.). 08-26-80.

Primary Examiner—Marvin M. Lateef
Attorney, Agent, or Firm—Berman & Aisenberg

[57] ABSTRACT

An electric resistance welding method for welding zinc plated steel plates. The zinc plated steel plates having at least one surface covered with a plating layer composed of mainly zinc can be welded by the present invention efficiently while overlapping said plating layers, because a material for increasing the resistance between the zinc plated steel plates is employed in the present invention, and it is either spreaded, coated or bonded on the surface of said plating layers to be joined beforehand. Thus, the electric resistance of zinc plated steel plates can be performed by a lower electric current in a shorter time without deteriorating the anti-corrosion property of zinc plated steel plates, because the electric resistance between the steel plates has been increased by such a material.

5 Claims, 7 Drawing Sheets

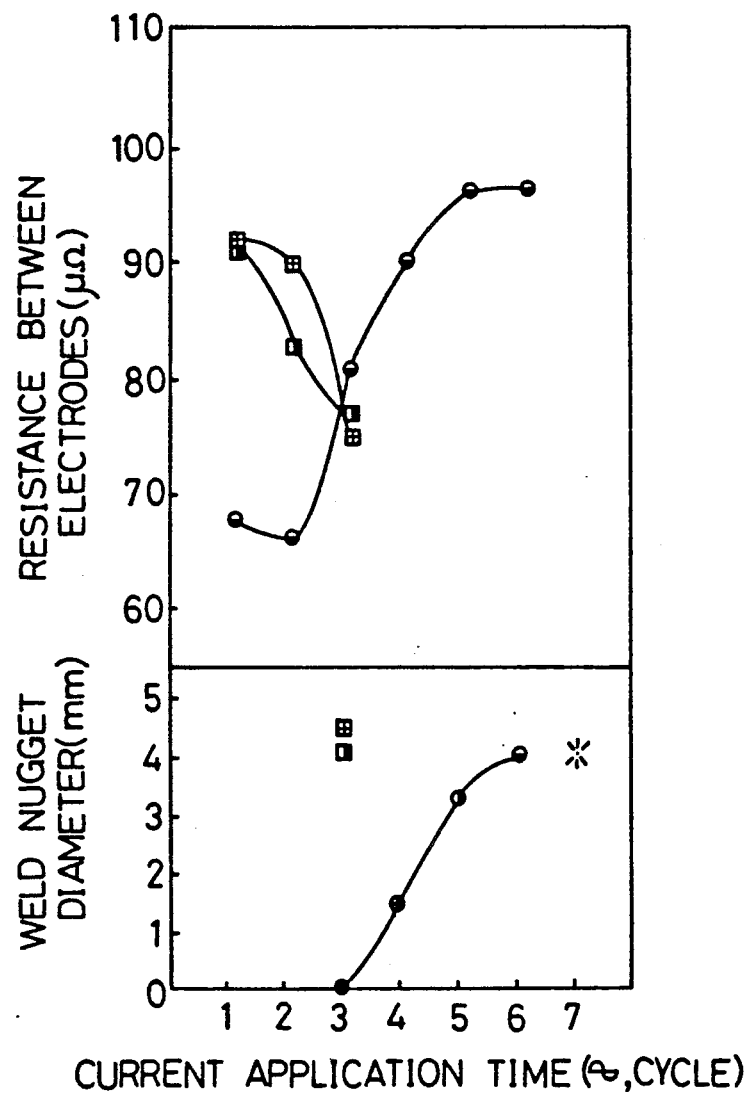

FIG.1

⊞ : SPECIMEN NO.1 (WITH ALUMINA PARTICLE APPLICATION)
◨ : SPECIMEN NO.2 (WITH ALUMINA PARTICLE APPLICATION)
● : SPECIMEN NO.3 (WITHOUT ALUMINA PARTICLE APPLICATION)
⊕ : SPECIMEN NO.4 (WITHOUT ALUMINA PARTICLE APPLICATION)
◐ : SPECIMEN NO.5 (WITHOUT ALUMINA PARTICLE APPLICATION)
⊖ : SPECIMEN NO.6 (WITHOUT ALUMINA PARTICLE APPLICATION)
✻ : SPECIMEN NO.7 (WITHOUT ALUMINA PARTICLE APPLICATION)

⊞ : SPECIMEN NO.15 (WITH SODIUM CHLORIDE APPLICATION)
◧ : SPECIMEN NO.16 (WITH SODIUM CHLORIDE APPLICATION)
□ : SPECIMEN NO.17 (WITHOUT SODIUM CHLORIDE APPLICATION)
● : SPECIMEN NO.18 (WITHOUT SODIUM CHLORIDE APPLICATION)
⊕ : SPECIMEN NO.19 (WITHOUT SODIUM CHLORIDE APPLICATION)
※ : SPECIMEN NO.20 (WITHOUT SODIUM CHLORIDE APPLICATION)

ELECTRIC RESISTANT WELDING FOR ZINC PLATED STEEL PLATE

RELATED APPLICATION

This application is a continuation-in-part of Ser. No. 117,913, filed Nov. 3, 1987 now U.S. Pat. No. 4,922,075.

BACKGROUND OF THE INVENTION

1. Field of the Invention

The present invention relates to resistance welding, and more particularly to an improvement in the resistance welding property of zinc plated steel plates.

2. Description of the Prior Art

Zinc plated steel plates, having at least one surface covered with a plating layer composed of mainly zinc, are widely used as a material for an automobile or a washing machine body. The zinc plated steel plates are generally joined by electric resistance welding such as spot welding, projection welding, and seam welding, but they have poor electric resistance welding properties compared with ordinary steel plates having no plating layer, because insufficient heat is generated on mating surfaces of the zinc plated steel plates. This results from the fact that zinc has a relatively low electric resistance value and the electric resistance value of the mating surfaces decreases because zinc is soft and provides good affinity between the zinc plated layers when zinc plated steel plates to be joined are pressed against each other. Accordingly, weld current and weld time for spot welding the zinc plated steel plates are increased by 25 to 50% and 50% to 100%, respectively, compared with the ordinary steel plates. Therefore, the electric power consumption increases.

In addition, the size of a weld nugget formed by welding varies, and the weld strength becomes unstable, and heat generation on the contacting surfaces of electrodes and the steel plates increases so that the electrodes are damaged badly. Further, zinc adhered to the electrodes should be removed frequently. Thus, the productivity becomes worse, and the manufacturing costs increase.

Since the anti-corrosion property of the zinc plated steel plates depends on the sacrificing corrosion of zinc, it is preferred to improve the anti-corrosion property by increasing the thickness of the zinc plating layer. When the thickness of the zinc plating layer is increased, the resistance welding property is further aggravated by the adverse effects mentioned above.

Consequently, as far as the material for automobile body is concerned, many zinc plated steel plates with less zinc adherence, sacrificing the anti-corrosion property, are used currently except for automobiles exported to North America and north Europe where snow-melting agents are spreaded on the roads. And the following are also used: alloyed zinc plated steel plates, zinc alloy plated steel plates, and multi-layered zinc plated steel plates. These are improved to provide better anti-corrosion property with relatively thin plating layer.

Although the zinc plated steel plates with thinner plating layer usually have good resistance welding property, their resistance welding property should further be improved because it is far inferior to that of bare steel plates without plating layer The improvement of the resistance welding property is desired especially for the zinc plated steel plate with much zinc adherence, which is superior in anti-corrosion property, used in automobile bodies exported to north America and north Europe where superior anti-corrosion property is required.

SUMMARY OF THE INVENTION

Accordingly, it is an object of the present invention to provide a resistance welding method for improving the resistance welding property of the zinc plated steel plates.

The present invention is an electric resistance welding method of welding zinc plated steel plates having at least one surface covered with a plating layer composed of mainly zinc, and comprises the following steps: placing a material for increasing the resistance between the zinc plated steel plates on at least one of the surfaces of the plating layers by spreading, coating or bonding; overlapping the plating layers; and welding the zinc plated steel plates. The material for increasing the resistance between the zinc plated steel plates may be a substance with bad electric conductivity for maintaining a clearance between the zinc plated steel plates. A substance which is a bad electric conductor itself is preferred for a resistance increaser; i.e. the material for increasing the resistance between the plates. For instance, a ceramic powder is an optimum material. However, an electric conductor may be used because it is possible to increase the resistance between the plates by maintaining the clearance in a satisfactory manner. Therefore the electric conductor is not excluded.

It is possible to apply the present invention to all zinc plated steel plates. Not to mention the double-sided or single-sided zinc plated steel plate, the present invention can be applied to the alloyed zinc plated steel plate which has improved adhesion property to paints as well as improved resistance welding property by making the zinc plating layer into Fe-Zn alloy, and to the alloy plated steel plate, such as Zn-Ni, Zn-Co-Cr and Zn-Al-Sn alloy plated steel plates, in which metal elements for making alloy are added to improve the anti-corrosion property of zinc plated steel plates, and to the multi-layered zinc plated steel plates, such as Zn/Mn and Zn/Ni multi-layered zinc plated steel plates aiming to improve their welding property and press forming property.

ADVANTAGES OF THE INVENTION

The resistance welding according to the present invention is performed while placing a resistance increaser between the mating surfaces of two zinc plated steel plates to be joined. Thus the welding can be performed by a lower electric current in a shorter period of time, because the electric resistance at a portion to be joined has increased. As a result, it is possible to perform the welding stably because the temperature rises at contacting surface of the electrode and steel plate becomes less and the electrode consumption becomes less. The deterioration of anti-corrosion property can also be avoided because dissipation of the zinc layer at pressed marks, generated on spot welded surface, decrease due to the same effects mentioned above.

The strength of welded portion is increased by the present invention. Since the heat generation occurs intensely on the limited portion of two steel plates' mating surfaces to be joined and the weld nugget thickness decreases, dents and deformations due to the welding are less likely to occur, and base metals are less likely to be affected by the heat.

No weld nugget is likely to be formed on portions other than the mating surfaces due to the effects mentioned above. When spot welding a relatively thin steel plate and a relatively thick steel plate, the weld nugget is often formed in the relatively thick steel plate at around the middle of its thickness instead of the desired mating surfaces. Such occurrence can be avoided effectively because the resistance increaser increases the electric resistance between the mating surfaces.

It is apparent that the electric power consumption is decreased by the weld current reduction mentioned above. In addition, the weld time is also reduced so that the efficiency of the welding operation is improved. Further, the defect occurrence rate decreases because an appropriate weld current range where an appropriate weld nugget can be formed while preventing the occurrence of weld flash and weld expulsion becomes wider and because it is easier to control the welding conditions.

BRIEF DESCRIPTION OF THE DRAWINGS

FIG. 1 illustrates results of an experimental spot welding on Example 1 according to the present invention.

DETAILED DESCRIPTION OF THE PREFERRED EMBODIMENTS

Example 1

Figure 2:
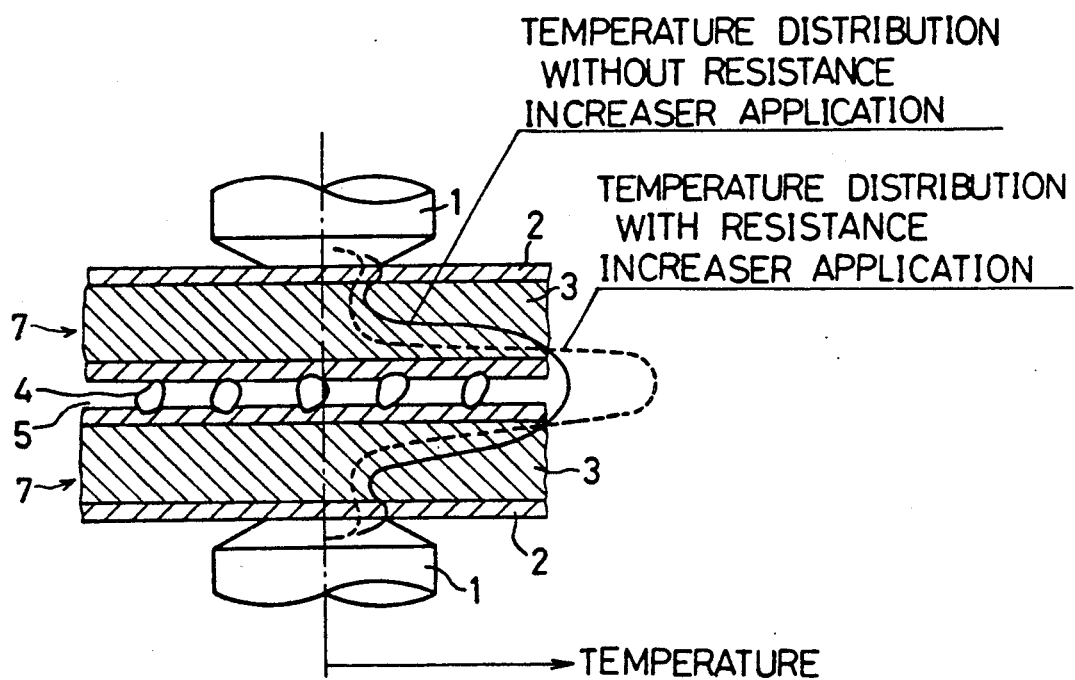
FIG. 2 shows a schematic cross-sectional view of a joint of Example 1 according to the present invention.

Two soft steel plates with 0.8 mm thickness were immersed into a bath containing melted zinc to form zinc plating layer of 60 g per 1 $m^2$ on both surfaces of the steel plates. Six alumina ($Al_2O_3$) particles powder with AN average grain diameter of 300 μm were spreaded evenly on the mating surface between thus prepared two zinc plated steel plates in which a weld nugget was to be formed. And the two zinc plated steel plates, one with the six alumina particles and one without the alumina, were overlapped. Then an experimental spot welding was performed under the following welding conditions:

Diameter of electrodes used: 16 mm
(Tip diameter: 6 mm)
Pressure: 220 kgf
Weld current set value: 11.0 KA
1 cycle of weld current: one-sixtieth sec.

The experimental spot welding was performed to specimens with the alumina particle application (Specimen No. 1 and No. 2), and also to specimens without the alumina particle application (Specimen Nos. 3–7). The results of the experimental spot welding are illustrated in FIG. 1, and other conditions of the experimental spot welding are shown in Table 1.

TABLE 1

| No. of Specification | Mark Resistance Increaser ($Al_2O_3$) | Weld current set value: 11.0 KA | | | | | | |
|---|---|---|---|---|---|---|---|---|
| | | Weld Current Value (KA) | | | | | | |
| | | 1∞ | 2∞ | 3∞ | 4∞ | 5∞ | 6∞ | 7∞ |
| 1 | ⊞ Applied | 7.3 | 10.0 | 10.9 | | | | |
| 2 | ▣ Applied | 7.4 | 10.2 | 10.7 | | | | |
| 3 | ● None | 7.5 | 10.3 | 10.6 | | | | |
| 4 | ⊕ None | 7.2 | 10.3 | 10.6 | 10.6 | | | |
| 5 | ◐ None | 7.3 | 10.2 | 10.4 | 10.4 | 10.8 | | |
| 6 | ⊖ None | 7.6 | 10.2 | 10.6 | 10.6 | 10.8 | 10.7 | |
| 7 | ✳ None | 7.2 | 10.2 | 10.5 | 10.6 | 10.6 | 10.8 | 11.0 |

In FIG. 1, the horizontal axis shows the current application time expressed in the number of weld current cycles, and the upper vertical axis shows the electric resistance between the electrodes during welding, and the lower vertical axis shows the diameter of the weld nugget (coalesced portion).

In case of the specimens with the alumina particle application, the weld current was applied until 3 cycles where an appropriate weld nugget was obtained. In case of the specimens without the alumina particle application, the weld current was applied extendedly until an appropriate weld nugget was obtained. In this experimental spot welding, an appropriate weld nugget was obtained for specimens without the alumina particle application when the current application time reached 5 to 6 cycles, however, the weld nugget became defective at 7 cycles due to the generation of weld flash.

For the electric resistance between the electrodes during welding or the dynamic resistance, the changes are plotted in FIG. 1 up to 3 cycles for Specimen No. 1 and No. 2 with the alumina particle application, and the change is plotted in FIG. 1 up to 6 cycles for Specimen No. 6 without the alumina particle application. The dynamic resistance curves of Specimen No. 3, No. 4, No. 5, and No. 7 are not plotted in FIG. 1 because they showed changes similar to Specimen No. 6. Here, the dynamic resistance shall mean a devices's electric resistance when it is in operation.

Since the weld current values during welding slightly differ from the set value, especially in the initial stages of the welding, and they varied with specimens, the weld current values at cycles are shown in Table 1 for all specimens.

As can be seen from the upper part of FIG. 1, though the dynamic resistance values vary slightly with specimens, the dynamic resistance values of the specimens with the alumina particle application are higher than that of the specimen without the alumina particle application in the initial stages of the welding, and their weld nuggets are formed in shorter current application times. Although, an ordinary zinc plated steel plate, i.e. a specimen without the almina particle application required 5 cycles of current application time to obtain a weld nugget with 3.5 mm diameter and required 6 cycles of current application time to obtain a weld nugget with 4.0 mm diameter, Specimen No. 1 with the alumina particle application required 3 cycles of current application time to obtain a weld nugget with 4.5 mm diameter and Specimen No. 2 with the alumina particle application also required 3 cycles of current application time to obtain a weld nugget with 4.1 mm diameter. Therefore, specimens with the alumina particle application require the weld time about half of the weld time of the specimen without the alumina particle application, though the current value is about the same for specimen with or without the particle application.

Further, the spot welding according to the present invention provides a wider range of appropriate current application time and weld current compared with those of the conventional spot welding, because there left only about 2 cycles allowance for specimens without the alumina particle application after the appropriate weld nugget was formed; i.e. a weld nugget with diameter of 3.5 mm or more in this experimental spot welding was formed, and weld flash occurrence made the weld nugget defective, but there left about 4 cycles allowance for specimens with the particle powder application.

It is understood that the advantages of the present invention seen from FIG. 1 are resulted form the following arrangements:

As shown in FIG. 2, since a resistance increaser 4 made of alumina particle is disposed between two steel plates 7, including base metals 3 and zinc plating layers 2 formed on the front and rear surfaces of the base metals 3, to be spot welded, a clearance 5 is formed between the mating surfaces of the two steel plates 7. The clearance 5 increases the electric resistance between the mating surfaces when welding the two steel plates with electrodes 1 pressed on the two steel plates. Heat is generated intensely between the mating surfaces, and the temperature of the mating surfaces increases faster than the temperatures of the other portions do.

The zinc plating layers 2 are melted first at the position on the mating surfaces with the highest temperature where a weld nugget is to be formed, and the melted zinc plating layers 2 are vaporized and expanded. Then they are excluded to the outside, and the base metals 3 are melted thinly over the mating surfaces. Thus a thin weld nugget is formed. As the weld nugget formation develops, the resistance value decreases.

On the other hand, when two zinc plated steel plates are overlapped without the alumina particle application, the resistance value between the plates is small. Consequently, the heat generation is less in the initial stage of weld current application, and no weld nugget is formed. As the current application is extended, the temperature rises over the wide areas of the base metals because of the resistance of the entire base metals or the volume resistivity. As the temperature of the base metal increases, the resistance value of the base metals increases. The heat generation is further increased by the temperature rise due to the resistance value increase, and finally a part of the base metals melts to form the weld nugget.

When the weld nugget is formed in the welding without the alumina particle application, the temperature is so high over the wide areas of the base metals that the weld flash is likely to be caused by a slight change of the current value, and that the formed weld nugget is thick.

Figure 8:
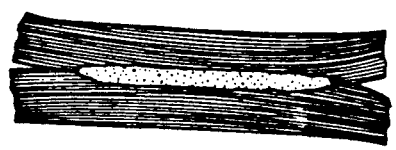
FIG. 8 shows a schematic cross-sectional view of Specimen No. 1's coalesced portion.
Figure 9:
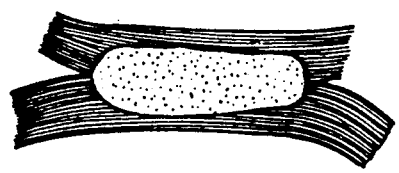
FIG. 9 shows a schematic cross-sectional view of Specimen No. 5's coalesced portion.

FIG. 8 illustrates the weld nugget formed in Specimen No. 1 with the alumina particle application, and FIG. 9 illustrates the weld nugget formed in Specimen No. 5 without the alumina particle application. Though the weld nugget diameter of Specimen No. 1 is slightly larger than that of Specimen No. 5, the weld nugget thickness of Specimen No. 1 is remarkably thinner than that of Specimen No. 5. A smaller weld nugget means that smaller energy is required to join component members. And a smaller heated area means that deformation during welding, residual stress and base metal deterioration becomes less. Accordingly, it is apparent that an optimum weld is obtained.

The alumina particle might be left in the weld nugget, but no problem will arise from the residual alumina particle because the alumina grain diameter is small and the alumina particle amount is small.

The electric resistance and thermal conductivity between the contacting surfaces of the electrodes 1 and the zinc plated steel plates are equal for the conventional spot welding and for the present invention employing the resistance increaser 4 disposed between the steel plates, however, the temperature of plating layers 2 contacting the electrodes 1 in the present invention is lower than that in the conventional spot welding because the welding is completed with a smaller current or an equal current but in a shorter period of time in the present invention. The temperature distribution of the present invention is drawn by the broken line in FIG. 2. Although the temperature distribution between the steel plates of the present invention is higher than that of the conventional spot welding without the resistance increaser 4 application drawn by the full line, the temperature distribution of the present invention is lower than that of the conventional spot welding when observing the temperature distribution as a whole, because the welding is completed in a shorter period of time in the present invention as mentioned above. Thus the anti-corrosion property improves and the consumption of the electrodes decreases, because the zinc dissipation amount of the zinc plated steel plates 7 at the portions contacting the electrodes 1 becomes less.

Example 2

Figure 3:
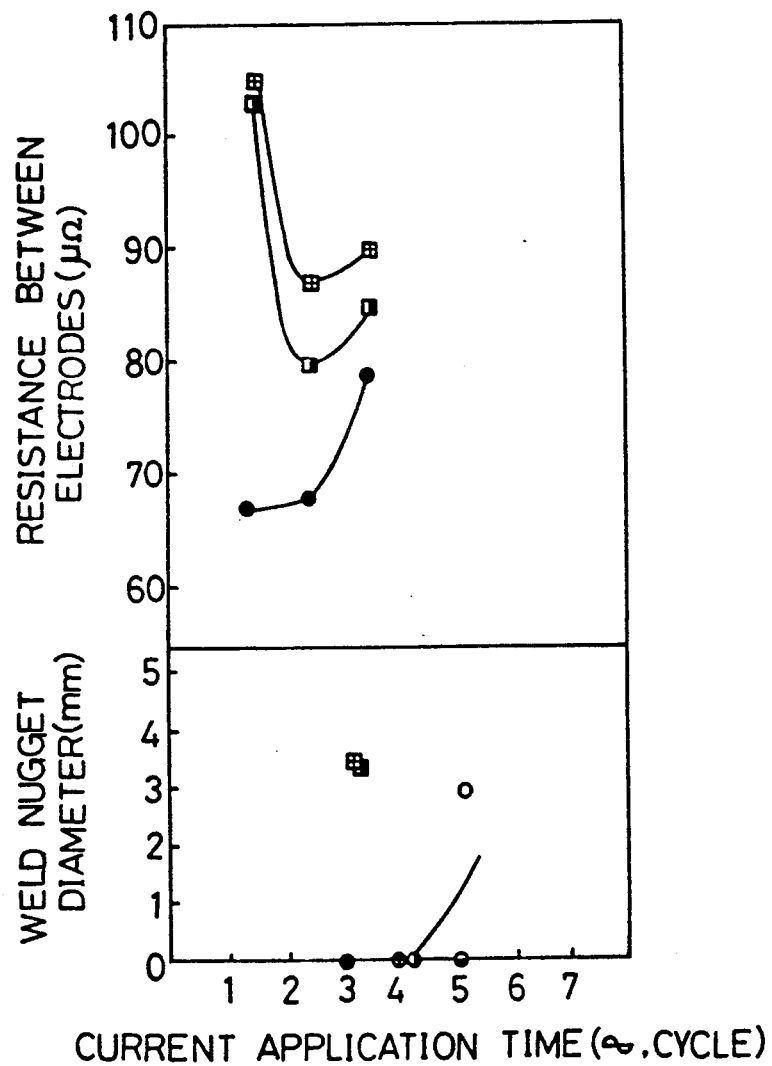
FIG. 3 illustrates results of an experimental spot welding on Example 2 according to the present invention.

In Example 2, a mending tape was employed in order to increase the resistance between the zinc plated steel plates when spot welding the zinc plated steel plates. The results of this experimental spot welding are illustrated in FIG. 3, and conditions of this experimental spot welding are shown in Table 2.

TABLE 2

| | Weld current set value: 10.5 KA | | | | | |
|---|---|---|---|---|---|---|
| No. of Specification | Mark Resistance Increaser (Mending Tape) | Weld Current Value (KA) | | | | |
| | | 1∞ | 2∞ | 3∞ | 4∞ | 5∞ |
| 8 | ⊞ Applied | 7.2 | 9.5 | 10.2 | | |
| 9 | ◻ Applied | 8.3 | 9.9 | 10.3 | | |
| 10 | ● None | 7.1 | 9.7 | 10.2 | | |
| 11 | ⊕ None | 7.3 | 9.7 | 10.1 | 10.1 | |
| 12 | ◑ None | 7.2 | 9.7 | 10.1 | 10.1 | |
| 13 | ⊖ None | 7.2 | 9.8 | 10.1 | 10.2 | 10.2 |
| 14 | ○ None | 7.1 | 9.7 | 10.2 | 10.1 | 10.1 |

The zinc plated steel plate, the electrode and the pressing force employed in this experimental spot welding were the same as those of Example 1 mentioned earlier, but the weld current set value was 10.5 KA.

Figure 4:
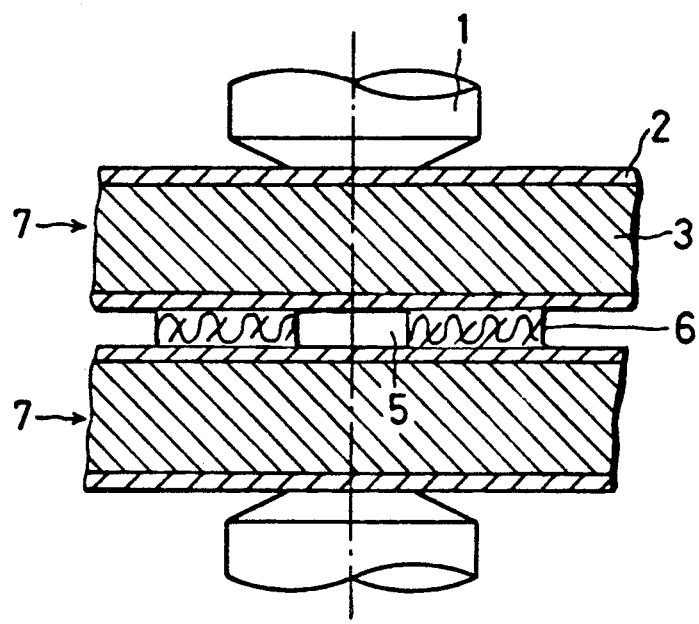
FIG. 4 shows a schematic cross-sectional view of a joint of Example 2 according to the present invention.
Figure 5:
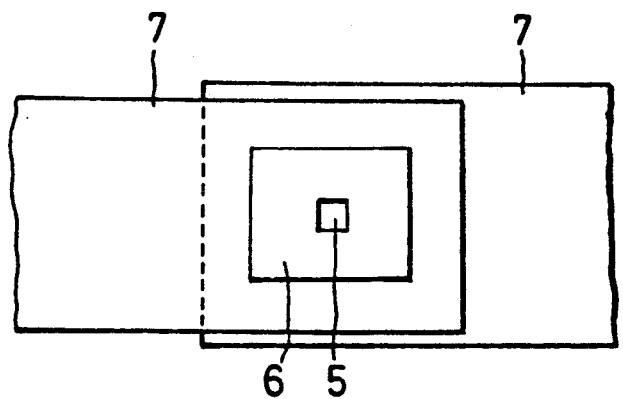
FIG. 5 shows a plan view the joint of Example 2 shown in FIG. 4.

As shown in FIGS. 4 and 5, a mending tape 6 was bonded to one of the zinc plated steel plates to be spot welded in this Example 2. And the spot welding is performed while taking the surface bonded with the mending tape 6 as one of the mating surfaces. The middle of the mending tape 6 was cut off by 4 mm×4 mm in a squared shape to maintain the maximum clearance of 0.1 mm between the two zinc plated steel plates to be welded. (The thickness of the mending tape 6 was 0.1 mm.) The specimens were so disposed between the electrodes 1 that the center of the specimen's cut-off aligned with the center of the electrodes 1.

The experimental spot welding was performed on specimens with the mending tape 6 application (Specimen No. 8 and No. 9), and also on specimens without the mending tape 6 application (Specimen Nos. 10–14).

For the electric resistance between the electrodes, the changes are plotted in FIG. 3 for Specimen No. 8 and No. 9 with the mending tape 6 application, and the change is plotted in FIG. 3 for Specimen No. 10 as a representative of the specimens without the mending tape 6 application. The results of the experimental spot welding showed the same tendencies as those of Example 1 in which the alumina powder was employed as the resistance increaser.

Figure 10:
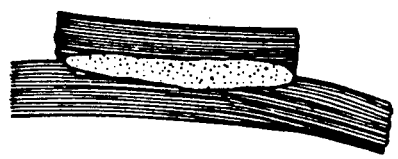
FIG. 10 shows a schematic cross-sectional view of Specimen No. 8's coalesced portion.

When the resistance between the plates was increased by the mending tape 6, the dynamic resistance was large in the initial stages of the welding, and 3 cycles of weld current application time were required to obtain a weld nugget with 3.5 mm diameter. On the other hand, when the mending tape 6 was not employed, no weld nugget was formed at 3 and 4 cycles of weld current application time, a weld nugget with 3 mm diameter was obtained for Specimen No. 14, but no weld nugget was formed for Specimen No. 13. FIG. 10 illustrates the weld nugget formed in Specimen No. 8 with the mending tape 6 application at 3 cycles of weld current application. The thickness of the weld nugget is remarkably thin as in the case of Example No. 1 in which the alumina particle was employed.

Example 3

Figure 6:
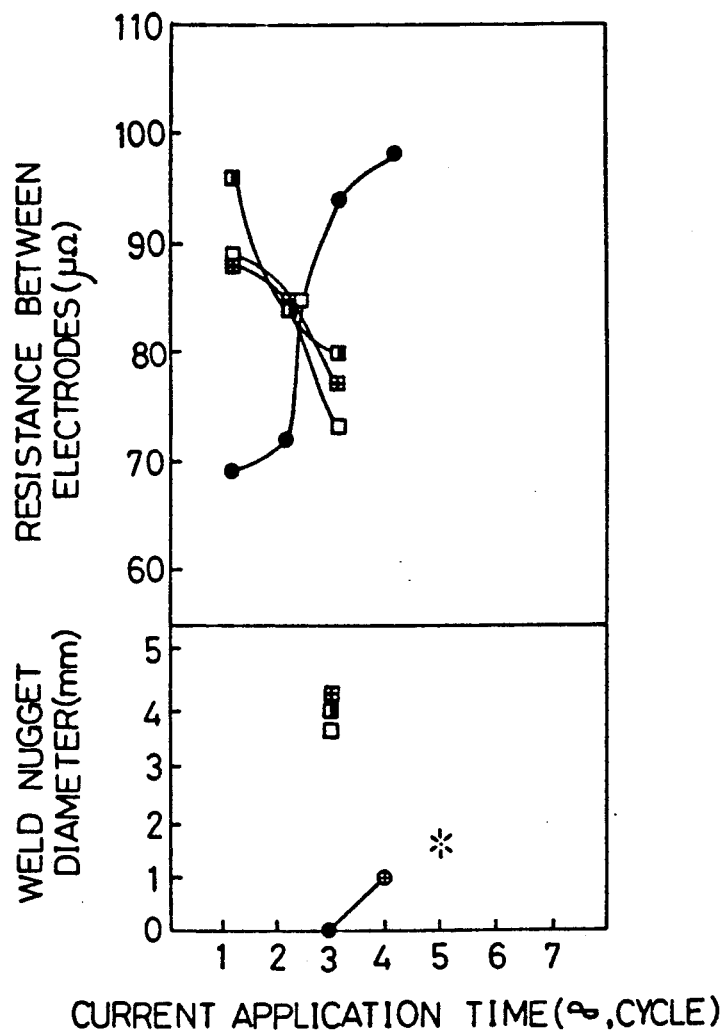
FIG. 6 illustrats results of an experimental spot welding on Example 3 according to the present invention.

A commercially available sodium chloride grain was employed as the resistance increaser in Example 3. The results of this experimental spot welding are illustrated in FIG. 6, and conditions of this experimental spot welding are shown in Table 3.

TABLE 3

| | Weld current set value: 12.0 KA | | | | | |
|---|---|---|---|---|---|---|
| No. of Specification | Mark Resistance Increaser (sodium-chloride) | Weld Current Value (KA) | | | | |
| | | 1∞ | 2∞ | 3∞ | 4∞ | 5∞ |
| 15 | ⊞ Applied | 8.0 | 11.2 | 11.4 | | |
| 16 | ◧ Applied | 8.0 | 11.2 | 11.5 | | |
| 17 | ☐ Applied With Glue | 7.6 | 11.2 | 11.6 | | |
| 18 | ● None | 7.3 | 11.0 | 11.1 | | |
| 19 | ⊕ None | 7.5 | 11.1 | 11.2 | 11.2 | |
| 20 | ✲ None | 7.8 | 11.2 | 11.2 | 11.2 | 11.6 |

The zinc plated steel plate, the electrode and the pressing force employed in this experimental spot welding were the same as those of Example 1 mentioned earlier, but the weld current set value was 12.0 KA.

For Specimen No. 15 and No. 16, the experimental spot welding was perfomed after disposing six sodium chloride grains with 250 μm average grain diameter evenly at joints where a weld nugget was to be formed. And for Specimen No. 17, the sodium chloride grains were fixed on the zinc plated steel plate by spraying glue before performing the experimental spot welding. The same experimental spot welding was performed to Specimen No. 18, No. 19 and No. 20 without the sodium chloride application.

It is apparent from FIG. 6 that the same advantages offered by Examples 1 and 2 are also available for Example 3 where the sodium chloride was used to increase the resistance between the plates.

Figure 11:
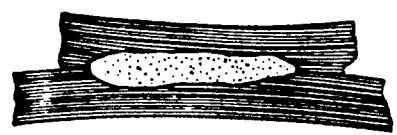
FIG. 11 shows a schematic cross-sectional view of Specimen No. 17's coalesced portion.

The initial dynamic resistance was large, and 3 cycles of weld current application time were required to obtain a weld nugget with 4 mm diameter. Also, Specimen No. 17, in which the sodium chloride grains were fixed on the steel plate by spraying glue, exhibited similar tendencies as those of Specimen No. 15 and No. 16, in which no glue was applied. A weld nugget with 3.5 mm diameter was formed in Specimen No. 17. This result shows that the present invention can be applied to inclined joint surfaces off horizontal and the welding operation in windy environments without any difficulty by fixing a resistance increaser with glue. FIG. 11 illustrates the weld nugget formed in Specimen No. 17 with the sodium chloride application, in this case the thickness of the weld nugget is also thin. Although sodium chloride is a corrosive substance, it is believed that the sodium chloride will not affect the weld adversely, because most of the sodium chloride vaporizes during the welding, and because the sodium chloride can be washed away if it remained around the weld nugget.

On the other hand, when the sodium chloride was not used, no weld nugget was formed at 3 cycles of weld current application time. A small nugget with 1 mm diameter was formed at 4 cycles, however, the weld flash occurred at 5 cycles, and damaged the weld nugget.

In actual welding operations, the weld current set value is often established at a slightly higher value according to various reasons. However, when it is so established, it is hard to obtain an appropriate weld nugget by the ordinary welding without the resistance increaser application, because the ordinary welding offers a narrower range of the appropriate weld current application time.

Figure 7:
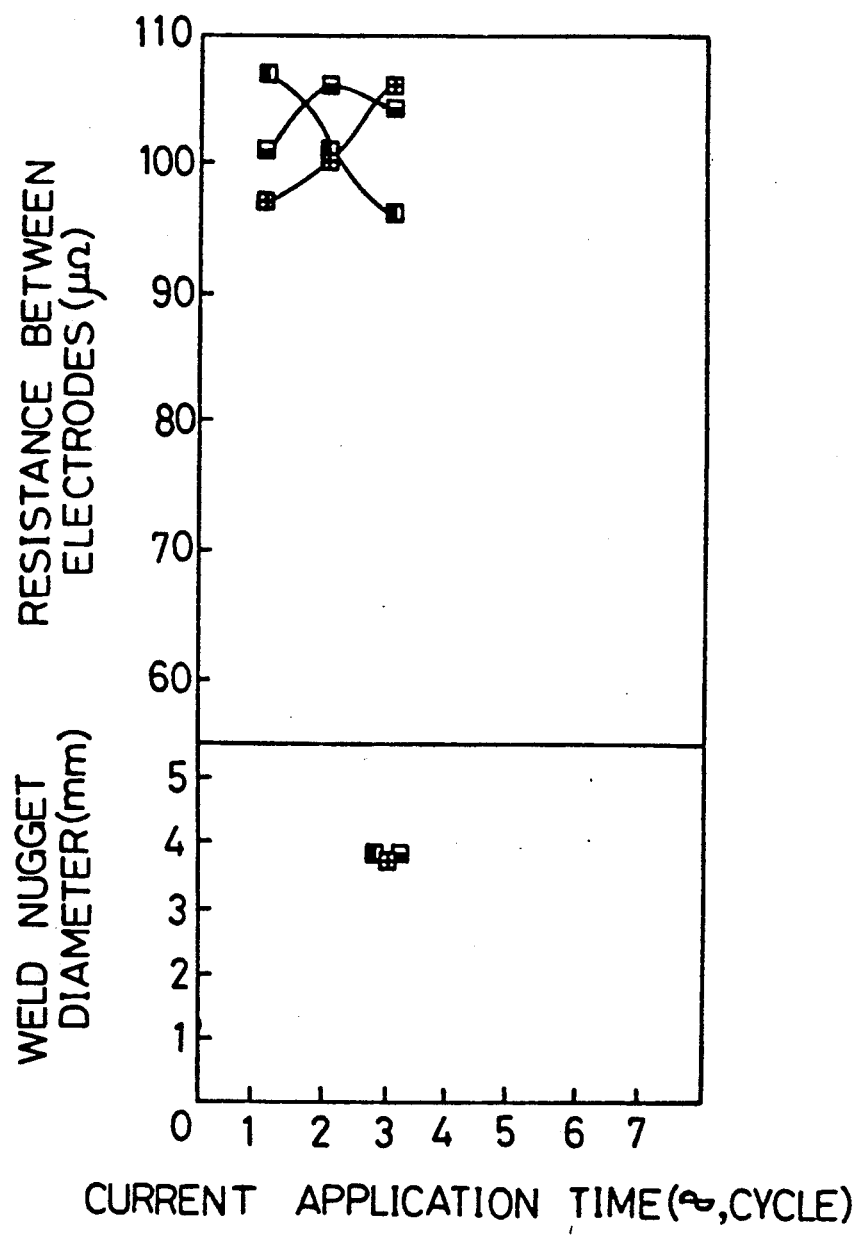
FIG. 7 illustrates results of an experimental spot welding on Example 4 according to the present invention.

FIG. 7 illustrates results of spot welding using a paint film of about 15 μm film thickness and a weld current of 11.0 KA.

An important characteristic of the present invention is that when zinc plated steel plates, separated by a spacer of the invention, are pressed together by a pair of electrodes, most of the mating surfaces of the zinc plated steel plates contact each other. Tiny spaces are formed around a spacer positioned between the mating surfaces and the spaces are demarcated by the mated surfaces surrounding the spacer.

When a voltage is applied to the electrodes, first the zinc plating layers constituting the mating surfaces are heated and vaporized. The vaporized zinc flows out through the tiny spaces formed around the spacer. Thus, the surfaces of the bare steel plates facing each other are separated only by the thickness of the zinc plating layers. The tiny spaces filled with the zinc vapor are electrically conductive, and have a high electric resistance. Accordingly, the large electric current flowing to the highly resistive tiny spaces generates a large amount of heat. The heat melts the surfaces of the bare steel plates, and the plates, held under pressure, contact each other and are welded together.

Most of the mating surfaces of the zinc plated steel plates surrounding the spacer contact each other when pressed together between the electrodes. When separated by, for example, between four and ten alumina particles of 300 μm in diameter disposed between the zinc plated steel plates, a tiny space is formed around the particles, and the zinc plated steel plates contact each other over the rest of the mating surfaces. This is possible due to the pressure applied between the surfaces.

At the beginning of the spot welding process the interface resistance is small, or approximately the same as that of the zinc plated steel plates without any spacer. During the process of the invention the interface resistance is suddenly increased after a welding current is applied. The average interface resistance of the zinc plated steel plates with spacers in one cycle is higher than that of the zinc plated steel plates without any spacer. FIGS. 1 and 3 show the average of the interface resistances in one cycle.

Thus, it can be seen that, in the process of the invention, spot welding is carried out between zinc plated steel plates having at least one surface covered with the zinc plating by interposing a spacer, such as particles, between mating surfaces of the steel plates in which at least one of the mating surfaces is plated. The steel plates and the spacer are pressed together by means of a pair of opposing electrodes contacting outer surfaces of the steel plates on either side of the spacer. A voltage is applied between the pair of electrodes and the steel plates are welded together. Ceramic particles, such as alumina, or other particles, such as sodium chloride, are suitable. An appropriate number of particles may be between 4 and 10, preferably about 6 to 8 and the particles may have an average grain diameter from 250 μm to 300 μm. When tiny spaces are left around the spacer, the electrical resistance between the pair of electrodes is almost the same as that of the pair of electrodes without a spacer.

The two steel plates sandwiching the spacer are pressed by a pair of electrodes so that most of the surfaces of the steel plates are in contact except for the spacer and the tiny spaces around the spacer. This leaves room for the zinc vapor to flow into a thin weld nugget, as discussed above.

Figure 12:
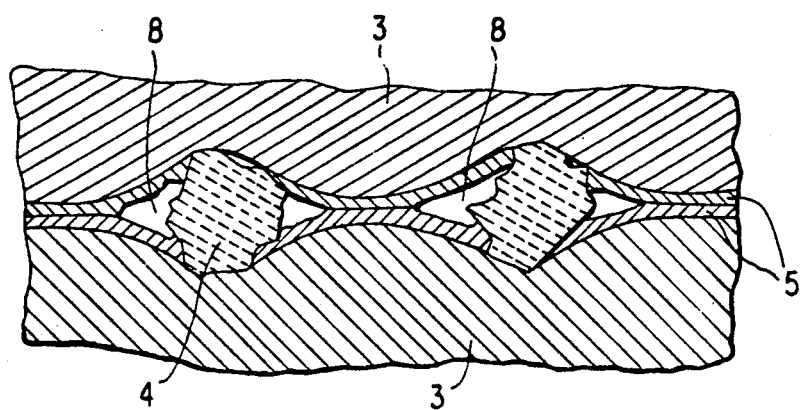
FIG. 12 shows a schematic cross-sectional view of spaces around spacer particles.

FIG. 12, particularly shows tiny spaces 8 around spacer particles 4. Spacer particles 4 are situated between steel plates 3 having a zinc plating layer 5 thereon. When an electric current is applied, as schematically shown in FIG. 2, zinc plating layers 5 coalesce as shown in FIG. 12 and a thin weld nugget, as shown in FIG. 11 is formed.

Obviously, many modifications and variations of the present invention are possible in light of the above teachings. It is therefore to be understood that within the scope of the appended claims, the invention may be practiced otherwise than as specifically described

What is claimed is:

1. A spot welding method for welding steel plates having at least one surface covered with a plating layer composed mainly of zinc, comprising of steps of:
    interposing a spacer comprising ceramic particles for forming a space between said steel plates of which at least one of the mating surfaces is the surface of said plating layer;
    pressing together said steel plates and said spacer by means of a pair of opposing electrodes, thereby contacting most of the surfaces of said steel plates around said spacer and leaving spaces around the said spacer so as to have substantially the same electric resistance between said pair of electrodes as that of the pair of electrodes pressing together said steel plates without said spacer; and
    applying a voltage between said pair of electrodes to weld said zinc plated plates.

2. A spot welding method according to claim 1, wherein the number of particles is between about 4 and 10.

3. A spot welding method according to claim 1, wherein the particles comprise alumina particles.

4. A spot welding method according to claim 1 wherein the particles comprise particles having an average grain diameter from about 250 μm to 300 μm.

5. A spot welding method for welding steel plates having at least one surface covered with a plating layer composed mainly of zinc, comprising of steps of:
    interposing a spacer comprising sodium chloride particles for forming a space between said steel plates of which at least one of the mating surfaces is the surface of said plating layer;
    pressing together said steel plates and said spacer by means of a pair of opposing electrodes, thereby contacting most of the surfaces of said steel plates around said spacer and leaving spaces around the said spacer so as to have substantially the same electric resistance between said pair of electrodes as that of the pair of electrodes pressing together said steel plates without said spacer; and
    applying a voltage between said pair of electrodes to weld said zinc plated plates.

* * * * *